United States Patent
Akkermans et al.

(10) Patent No.: US 8,655,026 B2
(45) Date of Patent: Feb. 18, 2014

(54) ROBUST BIOMETRIC FEATURE EXTRACTION WITH AND WITHOUT REFERENCE POINT

(75) Inventors: Antonius Hermanus Maria Akkermans, Eindhoven (NL); Sabri Boughorbel, Eindhoven (NL); Dirk Jeroen Breebaart, Eindhoven (NL); Alphons Antonius Maria Lambertus Bruekers, Eindhoven (NL); Berk Gokberk, Eindhoven (NL); Koen Theo Johan De Groot, Eindhoven (NL); Emile Josephus Carlos Kelkboom, Eindhoven (NL); Thomas Andreas Maria Kevenaar, Sterksel (NL); Aweke Negash Lemma, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/378,208

(22) PCT Filed: Jun. 17, 2010

(86) PCT No.: PCT/IB2010/052724
§ 371 (c)(1),
(2), (4) Date: Dec. 14, 2011

(87) PCT Pub. No.: WO2010/150146
PCT Pub. Date: Dec. 29, 2010

(65) Prior Publication Data
US 2012/0087550 A1 Apr. 12, 2012

(30) Foreign Application Priority Data
Jun. 24, 2009 (EP) .................................. 09163612

(51) Int. Cl.
*G06K 9/00* (2006.01)

(52) U.S. Cl.
USPC ............ 382/115; 382/124; 382/190; 235/380

(58) Field of Classification Search
USPC .......................................... 382/115, 124, 190
See application file for complete search history.

(56) References Cited

U.S. PATENT DOCUMENTS

| | | | | |
|---|---|---|---|---|
| 6,067,369 | A * | 5/2000 | Kamei | 382/125 |
| 7,286,691 | B1 | 10/2007 | Modl et al. | |
| 7,333,641 | B2 * | 2/2008 | Hara et al. | 382/125 |
| 7,773,779 | B2 * | 8/2010 | Shalev et al. | 382/115 |
| 2001/0036297 | A1 * | 11/2001 | Ikegami et al. | 382/115 |
| 2003/0103658 | A1 * | 6/2003 | Pan et al. | 382/124 |
| 2003/0223625 | A1 * | 12/2003 | Hillhouse et al. | 382/125 |
| 2004/0005087 | A1 * | 1/2004 | Hillhouse | 382/125 |
| 2004/0228508 | A1 * | 11/2004 | Shigeta | 382/124 |
| 2005/0175225 | A1 * | 8/2005 | Shinzaki | 382/124 |
| 2006/0239514 | A1 * | 10/2006 | Watanabe et al. | 382/115 |
| 2007/0036400 | A1 * | 2/2007 | Watanabe et al. | 382/124 |
| 2008/0019573 | A1 | 1/2008 | Baltatu et al. | |
| 2008/0077359 | A1 * | 3/2008 | Ito | 702/187 |

FOREIGN PATENT DOCUMENTS

| | | |
|---|---|---|
| GB | 2422708 A | 8/2006 |
| WO | 9846114 A2 | 10/1998 |
| WO | 2005122059 A1 | 12/2005 |

OTHER PUBLICATIONS

Maltoni et al: "Handbook of Fingerprint Rrecognition"; 2nd Edition Springer Verlag, 2009, Chapter 3—pp. 97-99, 120-130, Chapter 4, pp. 188-197, 216-220, Chapter 5, pp. 266-267.
Maltoni et al: "Handbook of Fingerprint Recognition"; 2nd Edition Springer Verlag, 2009, Chapter 7, "Biometric Fusion"; pp. 303-339.
F. A. Hernandez: "Biometric Sample Quality and its Application to Multimodal Authentication Systems": Universidad Politecnica De Madrid, Thesis Submitted for the Degree of Doctor of Philosophy & Doctor Europeus, Sep. 2008, 233 Page Document.
Fronthaler et al: "Fingerprint Image-Quality Estimation and its Application to Multialgorithm Verification"; IEEE Transactions on Information Forensics and Security, Jun. 2008, vol. 3, No. 2, pp. 331-338.
Fierrez-Aguilar et al: "Incorporating Image-Quality in Multi-Algorithm Fingerprint Verification"; Jan. 2005, Advances in Biometrics Lecture Notes in Computer Science, LNCS, pp. 213-220.

Xu et al: "A Quality Integrated Spectral Minutiae Fingerprint Recognition System"; Proceedings of the 30th Symposium on Information Theory in the Benelux, May 2009, 6 Page Document.

Tuyls et al: "Practical Biometric Authentication With Template Protection"; Audio and Video-Based Biometric Person Authentication, LNCS 3546, Jun. 2005, pp. 436-446.

K. Nilsson: "Symmetry Filters Applied to Fingerprints. Representation, Feature Extraction , and Registration"; Thesis for Doctor of Philosophy, Halmstad University, Sweden, 2005, 90 Page Document.

Nilsson et al: "Paper II-Prominent Symmetry Points as Landmarks in Fingerprint Images for Alignment"; ICPR-16 International Conference on Pattern Recognition , vol. III, pp. 395-398, IEEE Computer Society, Aug. 2002.

* cited by examiner

*Primary Examiner* — Vu Le
*Assistant Examiner* — Aklilu Woldemariam

(57) ABSTRACT

A basic idea of the present invention is to selectively employ one of at least two different feature extraction processes when generating a biometric template of an individual. An individual offers a physiological property, such as a fingerprint, an iris, an ear, a face, etc., from which biometric data can be derived, to a sensor of an enrollment authority. In the following, the property to be discussed will be fingerprints, even though any suitable biometric property may be used. From the fingerprint, a positional reference point of the biometric data is derived. The derivation of the positional reference point may be accomplished using any appropriate method out of a number of known methods. Such a reference point could be the location of a core, a delta, a weighted average of minutiae coordinates, or alike. Typically, the reference point includes a core of a fingerprint expressed as a three-dimensional coordinate denoted by means of $x_r$, $y_r$, and angle $α_r$. A contribution indicator is calculated for the derived positional reference point, and it is determined whether the derived positional reference point can be considered reliable. Depending on the reliability of the derived reference point, one of the two different feature extraction processes is selected; either the first feature set is extracted using a method which is invariant of the derived reference point, or a method is used taking into account the derived reference point. The better the estimation of the reference point is, the more reliable the reference point-dependent extraction method is. Finally, the biometric template is generated using the extracted first feature set.

12 Claims, 2 Drawing Sheets

ROBUST BIOMETRIC FEATURE EXTRACTION WITH AND WITHOUT REFERENCE POINT

FIELD OF THE INVENTION

The present invention relates to a method and system of generating a template from biometric data associated with an individual, and a method and system of verifying identity of an individual by employing biometric data.

BACKGROUND OF THE INVENTION

The process of authenticating a physical object is commonly undertaken in many applications, such as conditional access to secure buildings or conditional access to digital data (e.g. stored in a computer or removable storage media), or for identification purposes (e.g. for charging an identified individual for a particular activity, or for boarding passengers at airports).

The use of biometrics for identification and/or authentication is to an ever increasing extent considered to be a better alternative to traditional identification means such as passwords, pin-codes and authentication tokens. In biometric identification, features that are unique to a user such as fingerprints, irises, shape of ears, facial appearance, etc. are used to provide identification of the user. Today, fingerprints are the most common biometric modality; roughly 70% of the biometric market uses fingerprints for identity verification. The majority of fingerprint algorithms are based on minutiae locations which are processed in an adequate manner to form a biometric template of an individual. These locations are estimated during enrolment and verification. During enrolment—i.e. the initial process when an enrolment authority acquires the biometric template of a user—the user offers her biometric to an enrolment device of the enrolment authority which generates and stores the template, possibly encrypted, in the system. During verification, the user again offers her biometric to the system, whereby the stored template is retrieved (and decrypted if required) and matching of the stored and a newly generated template is effected, i.e. the minutiae locations that were obtained during enrolment are compared to those acquired during verification. If there is a good enough match, the user is considered authenticated.

Alternative approaches use shape-related parameters, such as directional field of ridges and valleys of a fingerprint image. Such directional field is estimated as a function of the position in the fingerprint and subsequently used as feature data (or a derivative thereof). Translations and rotations of the measurement data cause major problems when minutiae locations or shape-related parameters are to be matched. A user may place her finger differently during verification than during enrolment. In most cases, the comparison stage during verification requires a template alignment step before the actual comparison process is employed, in order to compensate for translation and rotation differences. More advanced comparison algorithms also take non-linear distortions into account.

In order to safeguard the integrity of individuals employing a biometric identification system whenever a breach of secrecy occurs in the system, cryptographic techniques to encrypt or hash the biometric templates and perform the verification (or matching) on the encrypted data such that the real template is never available in the clear can be envisaged. With the advent of these template protection techniques, which employ encryption or one-way functions to biometric data, template alignment during comparison is virtually impossible. Comparison is employed in the encrypted domain, and hence there is no access to the original biometric data for alignment or analysis purposes. As a result, alignment issues have to be resolved as a pre-processing step before generating the template.

A known method for alignment as a pre-processing step is to extract features, and to correct minutiae data by means of a certain reference point. This reference point could be found and/or generated with the help of core location(s), delta location, the average minutiae location, or any other relatively stable, reproducible reference location within the fingerprint image. If features are defined relative to this reference point, and this process is defined similarly for enrolment and verification, there is no need for an additional alignment step during comparison in the verification phase. Although the method of employing a reference point is quite successful in many cases, it can also cause problems. From empirical tests, it is estimated that for state-of-the-art fingerprint analysis algorithms, about 10% of the fingerprints do not have a reliable reference point (e.g., a unique core location). In such cases, alignment is performed using a badly estimated reference point or is not possible at all. In the verification phase, this has the consequence that an individual very well may be rejected even though she in fact should be authorized, which results in a significant degradation of verification performance on average for a whole population. Clearly, it is desirable not to erroneously reject authorized individuals, i.e. a low false rejection rate (FRR) is required. Thus, individuals having biometric characteristics not suitable for extraction of a reference point will either experience enrolment failure or a high FRR in the verification phase.

SUMMARY OF THE INVENTION

It is an object of the present invention to overcome this problem, and to provide a way of generating a template from biometric data associated with an individual.

This object is achieved by a method of generating a template from biometric data associated with an individual, and a method of verifying identity of an individual by employing biometric data as defined in the independent claims. Additional embodiments of the present invention are defined in the dependent claims, and further objects of the present invention will become apparent through the following description.

In a first aspect of the present invention, a method of generating a template from biometric data associated with an individual is provided. The method comprises the steps of deriving a positional reference point of the biometric data and a measure of reliability for the positional reference point, calculating a contribution indicator for the derived positional reference point, and extracting a first feature set from the biometric data, which first set is extracted taking into account the derived positional reference point, if the derived reference point is considered reliable. However, should the reference point be considered not reliable, the extraction of the first feature set is undertaken invariably of the derived positional reference point. Further, the method comprises the step of generating a template from the extracted first feature set and associating the template with the contribution indicator.

In a second aspect of the present invention, a method of verifying the identity of an individual by employing biometric data is provided. The method comprises the steps of deriving a positional reference point of the biometric data of the individual, if a contribution indicator being calculated during enrolment of the individual indicates that the positional reference point was considered reliable at enrolment. Further, the method comprises the steps of extracting, if the contribution indicator indicates reliability, a first feature set from the biometric data, which first feature set is extracted taking into account the derived positional reference point, and generating a template from the extracted first feature set. Finally, the method comprises the step of comparing the generated template to at least one enrolled template to check for correspondence, wherein the identity of the individual is verified if correspondence exists.

In a third aspect of the present invention, a device for generating a template from biometric data associated with an individual is provided. The device comprises a sensor and a processor, which sensor is arranged to derive a positional reference point of the biometric data of the individual and a measure of reliability for the positional reference point. The processor is arranged to calculate a contribution indicator for the derived positional reference point. The sensor is further arranged to extract a first feature set from the biometric data, which first feature set is extracted taking into account the derived positional reference point, if the positional reference point can be considered reliable. Moreover, the processor is further arranged to generate a template from the extracted first feature set and associate the template with the contribution indicator.

In a fourth aspect of the invention, a device for verifying identity of an individual by employing biometric data is provided. The device comprises a sensor and a processor. The sensor is arranged to derive a positional reference point of the biometric data of the individual, if a contribution indicator being calculated during enrolment of the individual indicates that the positional reference point was considered reliable at enrolment, and further to extract a first feature set from the biometric data, which first feature set is extracted taking into account the derived positional reference point, if the contribution indicator indicates reliability. The processor is arranged to generate a template from the extracted first feature set and to compare the generated template to at least one enrolled template to check for correspondence, wherein the identity of the individual is verified if correspondence exists.

A basic idea of the present invention is to selectively employ one of at least two different feature extraction processes when generating a biometric template of an individual. An individual offers a physiological property, such as a fingerprint, an iris, an ear, a face, etc., from which biometric data can be derived, to a sensor of an enrolment authority. In the following, the property to be discussed will be fingerprints, even though any suitable biometric property may be used. From the fingerprint, a positional reference point of the biometric data is derived. The derivation of the positional reference point may be accomplished using any appropriate method out of a number of known methods. Such a reference point could be the location of a core, a delta, a weighted average of minutiae coordinates, or alike. Typically, the reference point includes a core of a fingerprint expressed as a three-dimensional coordinate denoted by means of $x_r$, $y_r$, and angle $\alpha_r$. Further, it is determined whether the derived positional reference point can be considered reliable, and a contribution indicator is calculated for the derived positional reference point. Depending on the reliability of the derived reference point, one of the two different feature extraction processes is selected; either the first feature set is extracted using a method which is invariant of the derived reference point, or a method is used taking into account the derived reference point. The better the estimation of the reference point is, the more reliable the reference point-dependent extraction method is. Finally, the biometric template is generated using the extracted first feature set and the generated template is associated with the contribution indicator for subsequent verification.

In order to be able to qualify the estimation of the reference point, the contribution indicator is calculated for the derived reference point, and if an analysis indicates that the reference point is indeed present in the individual's fingerprint and further can be detected robustly, the contribution indicator is given a value of, say, 1. However, if no reference point can be found, the contribution indicator is given a value of 0.

In a first exemplifying scenario, if the contribution indicator has a value of 1, or being very close to 1, the biometric template to be generated from the first extracted feature set is generated using the extraction method taking into account the derived reference point, since this indicates a good estimation of the reference point and consequently that particular method of extraction can be considered reliable in this particular scenario. Thus, in this first scenario, presence of reference point in the biometric is signaled by the contribution indicator.

In a second exemplifying scenario, assuming that the contribution indicator has a value of 0, or being very close to 0, the biometric template to be generated from the first extracted feature set is generated using the reference point-invariant extraction method, since this indicates a poor estimation of the reference point and consequently the extraction method taking into account the derived reference point cannot be considered reliable in this particular scenario. Instead, an extraction method being invariant of the derived positional reference point is used. Thus, in this second scenario, absence of reference point in the biometric is signaled by the contribution indicator.

In an embodiment of the present invention, a second feature set is extracted from the biometric data. In this embodiment, the template is generated from anyone or both of the extracted feature sets, and the contribution indicator is further taken into account to determine contribution of the respective feature set in the generated template.

In this particular embodiment, the reliability indicator can assume any value in the range from 0 to 1. Of course, a different grading is possible. As in the previously described scenarios, if the value of the contribution indicator is close to 1, the biometric template to be generated from the first extracted feature set is generated using the extraction method taking into account the derived reference point, whereas if the value of the contribution indicator is close to 0, the biometric template to be generated from the first extracted feature set is generated using the reference point-invariant extraction method. Thus, only the first feature set need be extracted in case the contribution indicator indicates a very good, or very poor, estimation of the reference point.

However, the biometric template could be generated from subsets of features derived from the first and second feature sets, in which the contribution indicator determines the absolute or relative number of features used from both sets. Hence, in a third exemplifying scenario, assuming that the contribution indicator has a value of e.g. 0.5, i.e. the reliability of the derived reference point is considered good, but not outstanding, the first feature set is extracted using the reference point-dependent method. Further, the second feature set is extracted using the reference point-invariant method, and the biometric template to be generated from anyone or both of the extracted feature sets is generated from a combination of the first and second feature set, since this indicates a fairly good estimation of the reference point and consequently an extracted first feature set which can be considered acceptably reliable, or even highly reliable in parts. Consequently, subsets of features can be taken from the first extracted set and combined with subsets of features taken from the second extracted set to create a biometric template.

In line with the above, in an embodiment of the present invention, the contribution indicator itself indicates, depending on the grading selected, the contribution of the respective feature set in the generated template. For instance, a value of 0.5 could indicate that a 50/50-weight should be given for the two feature sets in the generated template. In an alternative embodiment, a separate feature set indicator is used for indicating the contribution of the respective feature set in the generated template. In such an alternative embodiment, the contribution indicator is only used for qualifying the estimation of the reference point and not for indicating the weight of the respective feature set in the generated template.

As can be seen, the present invention is advantageous, e.g. in that a combination of two different, and supplemental, feature extraction processes are used for generating a biometric template of an individual during enrolment. Thus, previously discussed problems in the prior art related to alignment issues are mitigated or overcome by the invention in that a feature extraction process taking reference point data into account is employed, while a reference point-invariant feature extraction process is employed should the estimation of a positional reference point from biometric data be poor or not possible at all. With the present invention, a reliable feature set is likely to be used for generating the biometric template.

The first feature set is derived, in case reference point estimation is good or at least acceptable, using an extraction process taking into account a biometric data reference point. An exemplifying reference-point extraction process will be described in the detailed description of embodiments of the invention The second feature set (or the first feature set in case of poor reference point estimation) is derived using a reference point-invariant extraction process, and can be derived using e.g. either (a) summary features analyzed over a complete fingerprint image or (b) dedicated transforms resulting in translation and/or rotation-invariant features. In the detailed description of embodiments of the invention, an approach falling under category (a) will be described. US patent application US2007/0266427 assigned to the present assignee and incorporated herein by reference discloses such a method.

During verification of an individual, the individual offers a corresponding physiological property from which biometric data can be derived, in this particular example a fingerprint, to a sensor of a verification authority. A contribution indicator calculated during enrolment of the individual is acquired and considered to determine whether to use (a) a feature extraction method taking reference point into account or (b) a feature extraction method being independent of reference point. In case the enrolment contribution indicator indicates that a reference point can be reliably derived, a positional reference point of the biometric data is derived, and a first feature set is extracted taking into account the derived positional reference point, since a corresponding extraction method was used during enrolment. However, should the contribution indicator calculated during enrolment indicate that estimation of the reference point is poor; a reference-point invariant method will be used for extraction. In that particular case, there is no need to derive a reference point during verification. Then, a template is generated from the extracted first feature set, which set accordingly has been extracted using a method corresponding to the method used during enrolment. When the verification template has been generated from the first feature set, the verification template is compared to at least one template generated during enrolment. If correspondence exists, the identity of the individual can be verified.

In case a combination of feature sets are used for the individual in the enrolment phase, then the same combination of features is used when verifying the individual. Thus, in an embodiment of the present invention, a positional reference point of the biometric data is derived. A contribution indicator calculated during enrolment of the individual is acquired for the derived positional reference point, which contribution indicator indicates a contribution of the respective feature set in the generated template. Then, a first feature set is extracted using the reference point-dependent method; while a second feature set is extracted using the reference point-invariant method. A template is generated from a combination of the extracted feature sets on the basis of the contribution indicator. Finally, the verification template is compared to at least one template generated during enrolment. If correspondence exists, the identity of the individual can be verified.

In alternative embodiment, the previously discussed feature set indicator is used for indicating the contribution of the respective feature set in the generated template. When the verification template has been generated from the appropriate feature set(s), the verification template is compared to at least one template generated during enrolment. If correspondence exists, the identity of the individual can be verified.

It should be noted that in practice, the verification template of the individual will most likely not be identical to the corresponding enrolment due to noise, misalignment, measurement errors, etc. A predetermined threshold value to be exceeded may be used in the step of comparing the verification template to the enrolment template. If the two templates are considered to match each other to a certain extent, i.e. a comparison value is above the threshold, the match is considered good enough.

Although the use of unprotected biometric templates has been described in the above, it should be noted that generation and matching of protected, i.e. encrypted, templates further may be employed in the present invention.

In the case where one single extracted feature set is employed to generate a template, the measure of reliability could replace the contribution indicator. Thus, the measure of reliability could indicate which one of the two different feature extraction processes is selected; either the method is used which is invariant of the derived reference point, or the method is used which takes into account the derived reference point. The better the estimation of the reference point is, the more reliable the reference point-dependent extraction method is. For instance, for a measure of reliability having a value of 1, or being very close to 1, the biometric template to be generated from the first extracted feature set is generated using the extraction method taking into account the derived reference point, while for a measure of reliability having a value of 0, or being very close to 0, the biometric template to be generated from the first extracted feature set is generated using the reference point-invariant extraction method.

Note that when verification of an individual's identity is performed in the present invention, this verification may imply either that authentication of an individual is performed or that identification of an individual is performed. In authentication, the individual claims to have a certain identity and offered biometric data is compared with stored biometric data (linked to the claimed identity) in order to verify correspondence between the offered and stored data. In identification, the offered biometric data is compared with a plurality of stored available biometric data sets, in order to verify correspondence between the offered and stored data. In any case, the offered data is compared to one or more stored data sets.

It is clear that the term "verification" may denote either "authentication" or "identification" throughout the application, depending on the context in which the term is used.

Further features of, and advantages with, the present invention will become apparent when studying the appended claims and the following description. Those skilled in the art realize that different features of the present invention can be combined to create embodiments other than those described in the following. It is noted that the invention relates to all possible combinations of features recited in the claims.

BRIEF DESCRIPTION OF THE DRAWINGS

These and other aspects of the present invention will now be described in more detail, with reference to the appended drawings showing embodiments of the invention.

DETAILED DESCRIPTION

Figure 1:
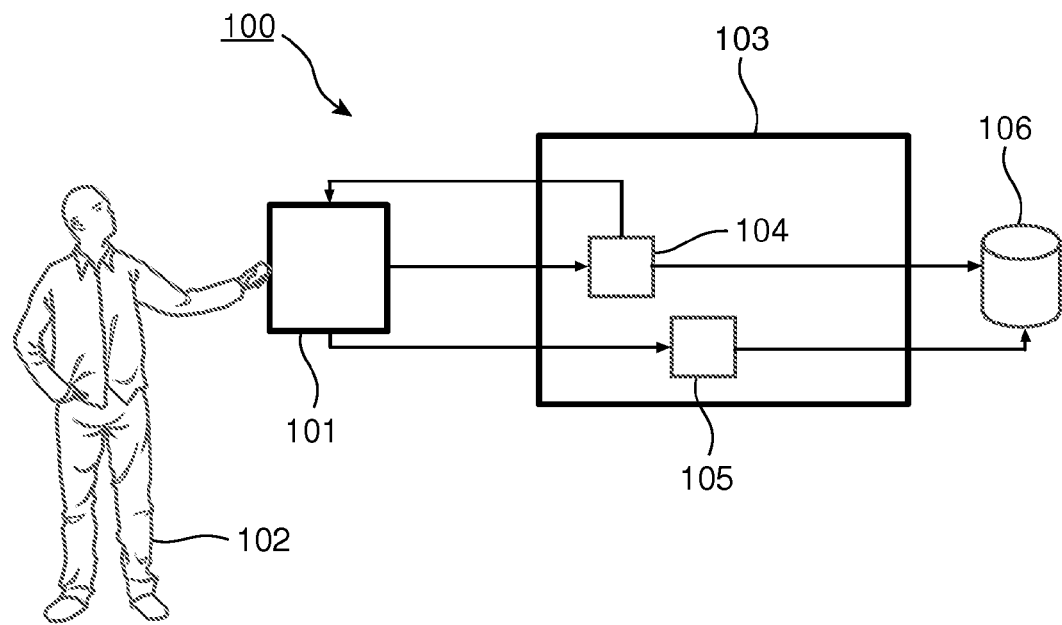
FIG. 1 shows a device for generating a template from biometric data associated with an individual in accordance with an embodiment of the invention.

FIG. 1 shows a device 100 for generating a template from biometric data associated with an individual in accordance with an embodiment of the invention. Thus, the device 100 illustrated in FIG. 1 is employed for enrolling in individual in a biometric identification system.

The enrolment device 100 comprises a sensor 101 for extracting feature sets from an offered biometrical property of an individual 102, e.g. a fingerprint. From the fingerprint, the sensor 101 derives a positional reference point of the biometric data and a measure of reliability for the positional reference point. A processor 103 calculates a contribution indicator for the derived positional reference point at block 104, and it is determined whether the derived positional reference point can be considered reliable. As illustrated in FIG. 1, the processor 103 feeds this information back to the sensor 101, and depending on the reliability of the derived reference point, one of two different feature extraction processes is selected; either a first feature set is extracted by the sensor 101 using a method which is invariant of the derived reference point, or the sensor 101 uses a method taking into account the derived reference point. The better the estimation of the reference point is, the more reliable the reference point-dependent extraction method is. Finally, the biometric template is generated at block 105 using the extracted first feature set. The generated biometric template is stored at memory 106 (located inside, or external to, the processor) together with the contribution indicator to subsequently indicate to a verifier which extraction method is to be used for the particular generated biometric template. For security reasons, the generated template may be encrypted at block 105 before being transferred to memory 106. Further, the memory 106 is not necessarily an integrated part of the enrolment device 100, but may be located remotely from the device, even in a different part of the world.

Figure 2:
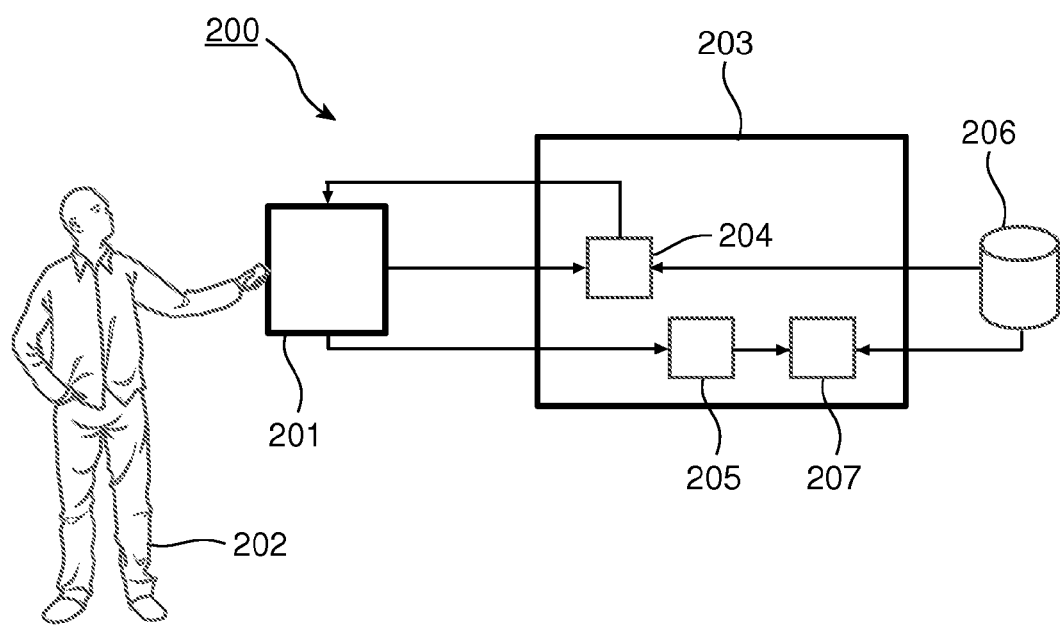
FIG. 2 shows a device for verifying identity of an individual by employing biometric data in accordance with an embodiment of the invention.

FIG. 2 shows a device 200 for verifying identity of an individual by employing biometric data in accordance with an embodiment of the invention. The verification device 200 of FIG. 2 very much resembles the enrolment device 100 of FIG. 1 structurally.

During verification of the individual 202, the individual offers a corresponding physiological property from which biometric data can be derived, in this particular example a fingerprint, to a sensor 201 of the verification device 200. A contribution indicator calculated during enrolment of the individual is acquired by block 204 of processor 203 from memory 206 and provided to the sensor 201. The contribution indicator is considered by the sensor 201 to determine whether to use (a) a feature extraction method taking reference point into account or (b) a feature extraction method being independent of reference point. In case the enrolment contribution indicator indicates that a reference point can be reliably derived, a positional reference point of the biometric data is derived by the sensor 201, and a first feature set is extracted taking into account the derived positional reference point, since a corresponding extraction method was used during enrolment. However, should the contribution indicator calculated during enrolment indicate that estimation of the reference point is poor; a reference-point invariant method will be used for extraction. In that particular case, there is no need to derive a reference point during verification. Then, block 205 generates a template from the extracted first feature set, which set accordingly has been extracted using a method corresponding to the method used during enrolment. When the verification template has been generated from the first feature set, the verification template is compared at block 207 to at least one template generated during enrolment and fetched from the memory 206. If correspondence exists, the identity of the individual 202 can be verified.

In a practical situation, the enrolment authority may coincide with the verifier, but they may also be distributed. As an example, if the biometric system is used for banking applications, all larger offices of the bank will typically be allowed to enroll new individuals into the system, such that a distributed enrolment authority is created. If, after enrolment, the individual wishes to withdraw money from such an office while using her biometric data as authentication, this office will assume the role of verifier. On the other hand, if the user makes a payment in a convenience store using her biometric data as authentication, the store will assume the role of the verifier, but it is unlikely that the store ever will act as enrolment authority.

As can be seen hereinabove, the individual has access to a device that contains a biometric sensor and has computing capabilities. In practice, the device could comprise a fingerprint sensor integrated in a smart card or a camera for iris or facial recognition in a mobile phone or a PDA. It is assumed that the individual has obtained the device from a trusted authority (e.g. a bank, a national authority, a government) and that she therefore trusts this device.

Now, a prior art method for extracting feature sets from biometric data, which method takes into account a derived positional reference point, is described in "Practical Biometric Authentication with Template Protection" by Pim Tuyls et al, AVBPA 2005, LNCS 3546, pp. 436-446, 2005, Springer-Verlag Berlin Heidelberg 2005. This method could be used in the present invention for extracting the first feature set.

With reference to section 2.3 denoted "Fingerprint Feature Extraction", a fixed length feature vector representation is presented, of which the elements can be compared one by one directly. The selected feature vector describes the global shape of the fingerprint by means of the local orientations of the ridge lines. In order to allow for direct comparison of the feature vectors, without requiring a registration stage during matching, the feature vectors have to be pre-aligned during feature extraction. For this purpose, the core point (i.e. the uppermost point of the innermost curving ridge) is used. These core points are automatically extracted using a known likelihood ratio-based algorithm. To describe the shape of the fingerprint, two types of feature vectors are extracted from gray scale fingerprint images.

The first feature vector is a squared directional field. It is evaluated e.g. at a regular grid of 16 by 16 points with spacings of e.g. 8 pixels, which is centered at the core point. At each of the 256 positions, the squared directional field is coded in a vector of two elements, representing the x- and y-values, resulting in a 512-dimensional feature vector.

The second feature vector is the Gabor response of the fingerprint. After subtraction of the spatial local mean, the fingerprint image is filtered by a set of four complex Gabor filters, which are given by:

$$h_{Gabor}(x,y) = \exp(-(x^2+y^2)/2\sigma^2) * \exp(j2\pi f \cdot (x \sin \theta + y \cos \theta))$$

The orientations $\theta$ are set to 0, $\pi/4$, $\pi/2$, and $3\pi/4$, the spatial frequency f is tuned to the average spatial ridge-valley frequency (f=0.11), and the width of the filter $\sigma$ is set such that the entire orientation range is covered ($\sigma$=3.5). The absolute values of the output images are taken, which are subsequently filtered by a low-pass Gaussian window. Again, samples are taken at a regular grid of 16 by 16 points with spacings of 8 pixels and centered at the core point. The resulting feature vector is of length 1024. The resulting feature vector that is used for matching is a concatenation of the squared directional field and the Gabor response. It describes the global shape of the fingerprint in 1536 elements. Thus, the extracted feature set is determined based on a derived positional reference point ("the core point").

Regarding the reliability of a derived core point, reference is made to section 3.1 denoted "Enrolment". The input feature vectors of person i is denoted as $X_i = \{X_{i,j}d\}_{j=1...M}$. A binary string $Q(X_{i,j})$ is constructed from the feature vector $X_{i,j}$. The t-th component of $Q(X_{i,j})$ for a fixed user i=1, ..., N is called reliable, if the values $(Q(X_{i,j}))_t$ for j=1 ... M are all equal. The boolean vector $Bi \in \{0, 1\}^k$ denotes the reliable bits. Its t-th entry equals one if the t-th component of $Q(X_{i,j})$ is reliable otherwise the t-th entry is zero.

Further, a prior art method for extracting feature sets from biometric data, which method operates independently of a positional reference point, is described in US patent application US2007/0266427 assigned to the present assignee. In brief, the method describes derivation of a first feature set X comprising n+1 components from a first set of biometric data $X_T$ and is transformed into a feature density function $f_{X,s}(x)$, $$f_{X,s}(x) = s(x) * \sum_{i=0}^{n} \delta(x - x_i),$$

by performing a summation of the different components, and convolving the resulting sum with an averaging function, whereby a new first feature vector $X_F = f_{X,s}(x)$ is created that advantageously can be used in a helper data scheme. This will typically be a sampled version of the density function, which results in feature vectors of equal and finite dimensions regardless of the number n+1 of components present in the feature set X.

Figure 3:
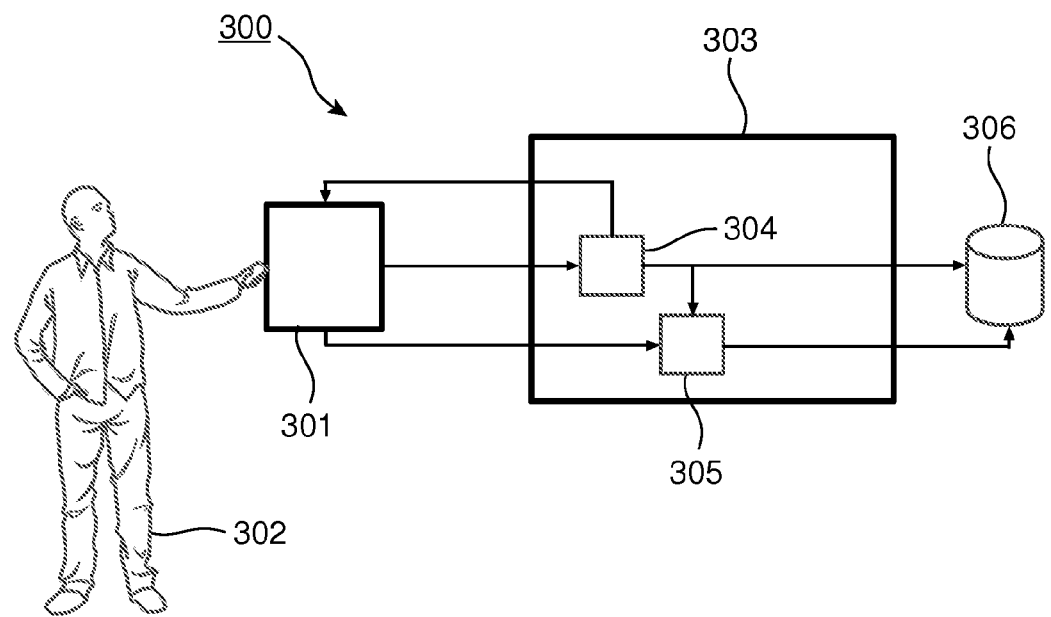
FIG. 3 shows a device for generating a template from biometric data associated with an individual in accordance with a further embodiment of the invention.

Returning to the present invention, reference is made to FIG. 3, where a further embodiment is described. In this particular embodiment, a template is generated using a combination of extracted feature sets. The device 300 of FIG. 3 is structurally very similar to the device 100 of FIG. 1. However, the contribution indicator is in this embodiment further provided to template generating block 305. The sensor 301 of the enrolment device 300 derives a positional reference point of the biometric data offered by the individual 302, and it is further determined whether the derived positional reference point can be considered reliable. The processor 303 calculates a contribution indicator for the derived positional reference point at block 304. In this particular embodiment, the reliability of the derived reference point is considered good, but not outstanding, and it is thus decided that the biometric template should be generated from subsets of features derived from a first and a second feature set. The processor 303 feeds this information back to the sensor 301, which extracts a first feature set using a method taking into account the derived reference point, and a second feature set using a method which is invariant of the derived reference point. Block 304 further provides template generation block 305 with the contribution indicator.

Finally, the biometric template is generated at block 305 using subsets of features derived from the first and second feature set, wherein the contribution indicator determines the absolute or relative number of features used from both sets in the template. The generated biometric template is stored at memory 306 together with the contribution indicator to subsequently indicate to a verifier the contribution of the respect feature set in the generated template.

Figure 4:
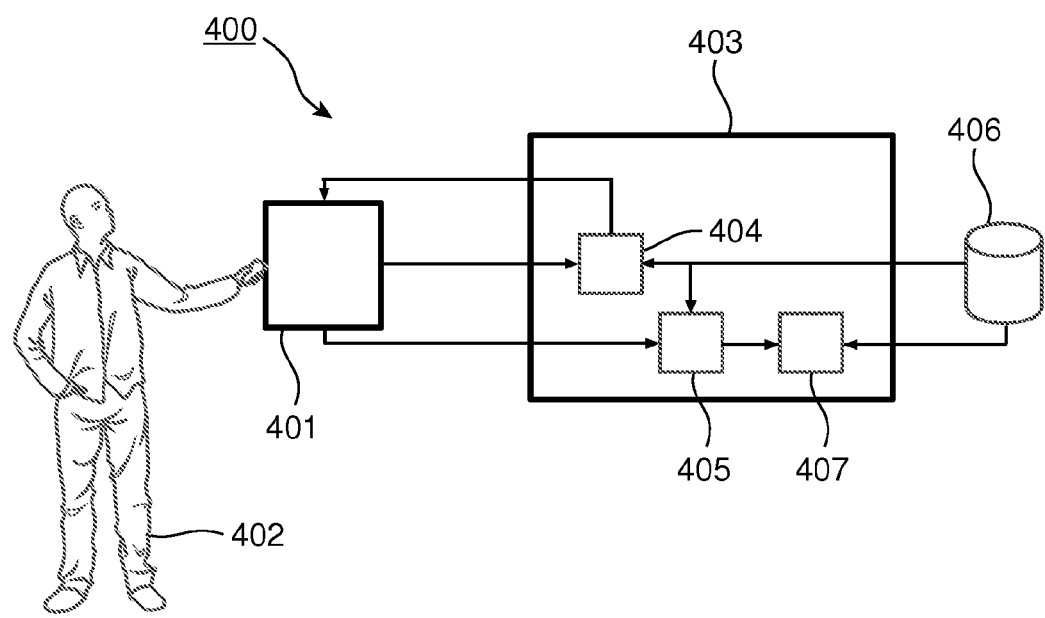
FIG. 4 shows a device for verifying identity of an individual by employing biometric data in accordance with a further embodiment of the invention.

FIG. 4 shows a device 400 for verifying identity of an individual by employing biometric data in accordance with a further embodiment of the invention. The verification device 400 of FIG. 4 very much resembles the enrolment device 300 of FIG. 3 structurally.

The individual 402 offers her fingerprint, to the sensor 401 of the verification device 400. A contribution indicator calculated during enrolment of the individual is acquired by block 404 of processor 403 from memory 406 and provided to the sensor 401. In this particular embodiment, the reliability of the derived reference point is considered good, but not outstanding, and it is thus decided that the biometric template should be generated from subsets of features derived from a first and a second feature set. The sensor 401 of the verification device 400 derives a positional reference point of the biometric data offered by the individual 402, and further extracts a first feature set using a method taking into account the derived reference point, and a second feature set using a method which is invariant of the derived reference point. Then, the biometric template is generated at block 405 using subsets of features derived from the first and second feature set, wherein the contribution indicator supplied by memory 406 determines the absolute or relative number of features used from both sets in the template. Finally, when the verification template has been generated from the first and second feature set, the verification template is compared at block 407 to at least one template generated during enrolment and fetched from the memory 406. If correspondence exists, the identity of the individual 402 can be verified.

It is clear that the devices of the present invention are arranged with microprocessors or other similar electronic equipment having computing capabilities, for example programmable logic devices such as ASICs, FPGAs, CPLDs etc. Further, the microprocessors execute appropriate software stored in memories, on discs or on other suitable media for accomplishing tasks of the present invention.

Further, it is obvious to a skilled person that the data communicated in, and in connection to, the devices described above can further be protected using standard cryptographic techniques such as SHA-1, MD5, AES, DES or RSA. Before any data is exchanged between devices (during enrolment as well as during verification) comprised in the system, a device might want some proof on the authenticity of another other device with which communication is established. For example, it is possible that the enrolment authority must be ensured that a trusted device did generate the enrolment data received. This can be achieved by using public key certificates or, depending on the actual setting, symmetric key techniques. Moreover, it is possible that the enrolment authority must be ensured that the user device can be trusted and that it has not been tampered with. Therefore, the devices may contain mechanisms that allow the enrolment authority to detect tampering. For example, Physical Uncloneable Functions (PUFs) may be used. A PUF is a function that is realized by a physical system, such that the function is easy to evaluate but the physical system is hard to characterize. Depending on the actual setting, communications between devices might have to be secret and authentic. Standard cryptographic techniques that can be used are Secure Authenticated Channels (SACs) based on public key techniques or similar symmetric techniques.

Also note that the enrolment data and the verification data may be cryptographically concealed by means of employing a one-way hash function, or any other appropriate cryptographic function that conceals the enrolment data and verification in a manner such that it is computationally infeasible to create a plain text copy of the enrolment/verification data from the cryptographically concealed copy of the enrolment/verification data. It is, for example possible to use a keyed one-way hash function, a trapdoor hash function, an asymmetric encryption function or even a symmetric encryption function.

The invention claimed is:

1. A method of generating a template from biometric data associated with an individual, the method comprising the steps of:
    deriving a positional reference point of said biometric data of the individual;
    deriving a measure of reliability for the positional reference point, wherein the measure of reliability is a reliability indicator indicating a reliability of the derived positional reference point;
    extracting a first feature set from said biometric data taking into account the derived positional reference point,
    if the derived measure of reliability indicates that the positional reference point is considered unreliable;
        (a) extracting a second feature set from said biometric data if the measure of reliability indicates that the positional reference point is unreliable;
        (b) calculating a contribution indicator for the derived positional reference point for determining an absolute or relative number of features used from the first and second feature sets in the generated template;
        (c) generating a template from either or both of the first and second extracted feature sets, wherein said contribution indicator is taken into account to determine a contribution of the respective first and second feature sets in the generated template;
    if the measure of reliability indicates that the positional reference point is reliable,
        (a) generating a template from the extracted first feature set and
        (b) associating the template with the calculated contribution indicator.

2. The method of claim 1, wherein the template is generated from subsets of features derived from the first and second feature sets, and the contribution indicator determines absolute or relative number of features used from the respective set in the generated template.

3. The method of claims 1, further comprising the step of:
    storing the generated template and the contribution indicator, said contribution indicator indicating the contribution of the respective feature set in the generated template.

4. The method of claims 1, further comprising the step of:
    storing the generated template and a feature set indicator, said feature set indicator indicating the contribution of the respective feature set in the generated template.

5. The method of claim 1, wherein said first feature set is extracted invariably of the derived positional reference point, if the contribution indicator indicates that the positional reference point is considered not reliable.

6. The method of claims 2, wherein said second feature set is extracted invariably of the derived positional reference point.

7. A method of verifying identity of an individual by employing biometric data, the method comprising the steps of:
    deriving a positional reference point of said biometric data of the individual, if the contribution indicator indicates that the positional reference point was considered reliable at enrollment;
    extracting a first feature set from said biometric data taking into account the derived positional reference point, if the contribution indicator indicates that the positional reference point was considered reliable at enrollment;
    otherwise extracting a second feature set from said biometric data if the contribution indicator does not indicate that the positional reference point was considered reliable at enrollment; and
    generating a template from anyone or both of the extracted feature sets, wherein said contribution indicator is taken into account to determine contribution of the respective feature set in the generated template
    comparing the generated template to at least one enrolled template to check for correspondence, wherein the identity of the individual is verified if correspondence exists.

8. The method of claim 7, wherein said first feature set is extracted invariably of the positional reference point, if the contribution indicator being calculated during enrolment indicates that the positional reference point is considered not reliable.

9. A device for generating a template from biometric data associated with an individual, the device comprising:
    a sensor; and
    a processor; wherein
    the sensor is arranged to derive a positional reference point of said biometric data of the individual and a measure of reliability for the positional reference point; and
    the processor is arranged to calculate a contribution indicator for the derived positional reference;
    if the measure of reliability indicates that the positional reference point can be considered reliable;
    said sensor further being arranged to extract a first feature set from said biometric data, said first feature set being extracted taking into account the derived positional reference point; and
    said processor further being arranged to generate a template from the extracted first feature set and associate the template with the calculated contribution indicator;
    if the measure of reliability indicates that the positional reference point can be considered unreliable:

said sensor further being arranged to extract a second feature set from said biometric data, said second feature set being extracted not taking into account the derived positional reference point;

said processor further being arranged to generate a template from either or both of the first and second extracted feature sets, wherein said contribution indicator is taken into account to determine a contribution of the respective first and second feature sets in the generated template; and associate the template with the calculated contribution indicator.

10. The device of claim 9, wherein said sensor further is arranged to extract a second feature set from said biometric data; and said processor further is arranged to generate a template from anyone or both of the extracted feature sets, wherein said contribution indicator is taken into account to determine contribution of the respective feature set in the generated template.

11. A device for verifying identity of an individual by employing biometric data, the device comprising:

a sensor; and a processor; wherein the sensor is arranged to derive a positional reference point of said biometric data of the individual, if a contribution indicator being calculated during enrollment of the individual indicates that the positional reference point was considered reliable at enrollment;

if the contribution indicator indicates reliability, the sensor is arranged to extract a first feature set from said biometric data, said first feature set being extracted taking into account the derived positional reference point, if the contribution indicator indicates reliability; and the sensor is arranged to extract a second feature set from said biometric data irrespective of the reliability of the contribution indicator; and said processor being arranged to generate a template from anyone or both of the first and second extracted feature sets, wherein said contribution indicator is taken into account to determine contribution of the respective feature set in the generated template; and to compare the generated template to at least one enrolled template to check for correspondence, wherein the identity of the individual is verified if correspondence exists.

12. A non-transitory computer readable storage medium comprising computer-executable components for causing a device to perform the steps recited in claim 1 when the computer-executable components are run on a processing unit included in the device.

* * * * *